March 5, 1957     R. R. ROBERTS     2,783,687
WORK TABLE FOR BORING MILLS AND THE LIKE
Filed June 30, 1953
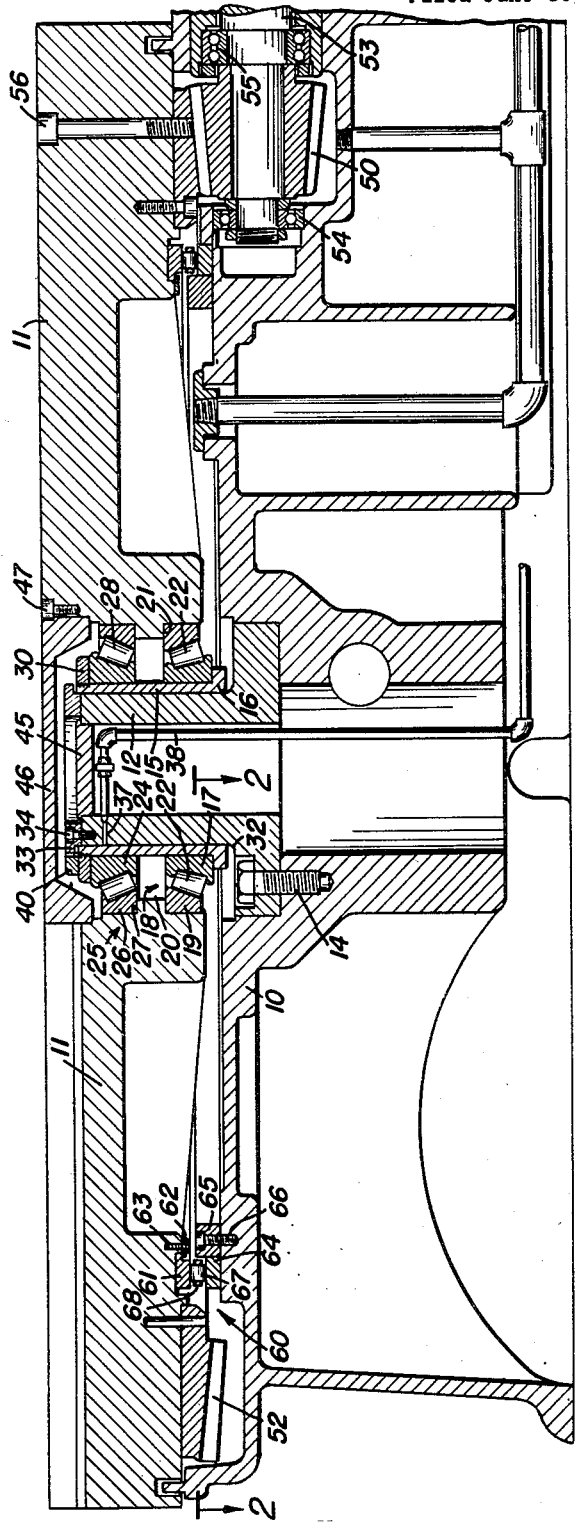
INVENTOR.
ROLAND R. ROBERTS
BY
ATTORNEY United States Patent Office 2,783,687
Patented Mar. 5, 1957

2,783,687
WORK TABLE FOR BORING MILLS AND THE LIKE

Roland R. Roberts, Irondequoit, N. Y., assignor, by mesne assignments, to Farrel-Birmingham Company, Incorporated, Ansonia, Conn., a corporation of Connecticut Application June 30, 1953, Serial No. 365,170

1 Claim. (Cl. 90—58)

The present invention relates to machine tools and more particularly to rotating work tables for vertical boring mills and the like.

Vertical boring mills are adapted to operate upon relatively large and heavy workpieces. When a turning or facing operation is being performed upon a vertical boring mill, the cutting tool or tools at times during the operation will exert considerable leverage on the work, especially when cutting at and adjacent to the periphery of the work at or adjacent the upper face thereof. This will cause the table, unless properly mounted, to be tilted or canted with the result that the desired accuracy will not be attained in the turning or facing operation.

Attempts have been made in the past to hold the work table in proper relation to the bed of the machine by mounting the table centrally on opposed conical antifriction bearings in such way as to prevent any upward displacement of the table. The axial thrust of the cut was then further taken by plain bearings adjacent the periphery of the table. It was found in practice, however, that the heat generated by the load on both types of bearings caused the table to bow, and place additional load on the plain bearings requiring an excessive amount of power for rotating the table  In an attempt to overcome this, it has been proposed to mount the table centrally on a single row combined antifriction radial and thrust bearing, and to further take the axial thrust by an antifriction bearing disposed between the table and the bed near the periphery of the table. In the known construction, however, the combined radial and thrust bearing was preloaded, thereby also preloading the axial thrust bearing. Because of the preloading, however, heat is generated and the table will bow and pull up the central bearing, causing reaction and additional loading on the outer bearing, resulting in further friction and generation of heat. Hence, despite use of antifriction radial and thrust bearings excessive power is again required to drive the work table, and the desired accuracy is not attained in the work.

One object of the present invention is to provide a mounting for a rotary table of the character described which will permit the table to run free under operating conditions.

Another object of the invention is to provide a mounting for centering a rotary work table which will automatically adjust itself to compensate for any tendency of the table to bow, thereby obviating additional loading of the axial thrust bearings which support the table near its periphery.

Another object of the invention is to provide a mounting for a rotary work table of the character described, in which the bearing that centers the table is free to float so as to adjust itself should the table tend to bow, thereby avoiding overloading the main axial thrust bearing, and avoiding any need for excessive power to rotate the table.

A further object of the invention is to provide a mounting for a rotary work table whereby the axial thrust may be taken by antifriction bearings, but in which the work table will be so supported centrally that should any distortion of the table occur due to heating there will be no additional load placed upon the axial thrust bearings.

Another object of the invention is to provide a mounting for a rotary work table in which the table is centered by an anti-friction bearing, and axial thrust is further taken by an additional bearing or bearings, either plain or anti-friction, which is or are disposed between the table and the bed or support, on which the table is rotatable, and which is or are mounted between the central bearing and the periphery of the table, and in which the central bearing is free to float axially to avoid overloading the additional axial thrust bearing or bearings.

Still another object of the invention is to provide a mounting for a rotary work table in which the table is centered by an anti-friction combined radial and thrust bearing, and the axial thrust is further taken by an anti-friction thrust bearing mounted adjacent the periphery of the table, and the central bearing is free to float axially to avoid overloading the thrust bearing.

Other objects of the invention will be apparent hereinafter from the specification and from the recital of the appended claim.

In the drawing:

Fig. 1 is a vertical section taken centrally of the work table of a boring mill showing a table mounting constructed according to one embodiment of this invention;

Fig. 2 is a fragmentary section on the line 2—2 of Fig. 1 looking in the direction of the arrows and on a considerably reduced scale;

Fig. 3 is a fragmentary axial section on a considerably enlarged scale showing particularly the relation between the stop ring and the sleeve on which the antifriction radial thrust bearings are mounted, which permits limited floating movement of these bearings; and Fig. 4 is a fragmentary plan view showing the means for locking the stop ring in adjusted position.

Referring now to the drawing by numerals of reference, 10 denotes the base or bed of the boring mill and 11 is the work table which is rotatably mounted thereon. The table is centered by a post 12 which is disposed centrally of the table in a central bore thereof and which is secured to the bed 10 by screws 14.

Slidably journaled upon the post 12 is a sleeve 15 which has an outwardly projecting flange 16 at its lower end. This flange serves to support the inner race-way 17 of a lower conical roller bearing designated as a whole at 18. The tapered rollers of this bearing are denoted at 22. The outer race-way of this bearing is denoted at 19. It fits into the central bore 20 of the table and against the shoulder 21 formed by a counterbore of enlarged diameter extending upwardly from the lower face of the table.

The sleeve 15 also serves to support the inner race 24 of an upper tapered roller bearing, which is denoted as a whole at 25. The outer race-way of the bearing 24 is denoted at 26. It is supported upon a shoulder 27 formed by a counterbore at the upper end of the bore 20. The tapered rollers of the bearing 25 are designated at 28.

The two shoulders 21 and 27 lie at opposite sides of an internal rib formed in the bore 20 by the counterbores at the upper and lower ends of this bore.

The two bearings 18 and 25 are opposed tapered roller bearings and may be of conventional construction. A nut 30, which threads onto the sleeve 15 and which engages the upper face of the inner race 24 of the upper bearing 25, serves to permit preloading of the bearings 18 and 25. The sleeve 15 itself, however, is free to float vertically on the post 12, its downward movement being limited by the fillet 32 formed on the post 12, and its upward movement being limited by a stop ring 33.

The stop ring 33 is secured to the hub or post 12 by screws 34. It is faced off on its underface to have a clearance 35 (Fig. 3) of approximately .010″ with reference to the upper face of the sleeve 15, thereby to permit .010″ upward floating movement of the sleeve.

The bearing between the sleeve 15 and the post or hub 12 is lubricated through a duct 37 which extends radially through the hub 12 and which is supplied with a suitable lubricant by the pipe 38.

The threaded ring or nut 30 is secured against rotation by a detent 40 (Figs. 3 and 4) which is secured to the ring 30 by screws 41 and which is provided with internal coupling teeth 42 that engage external coupling teeth 43 formed on the ring 33.

The bore of the post 12 is closed at its upper end by a cap 45; and the bore 20 of the table is covered at its upper end by a cap 46. The latter may be held in position by cap screws 47 which are countersunk into the table and which engage recesses formed around the periphery of the cap 46.

Through the antifriction bearings 18 and 25 the table is accurately centered and rotatably supported on the post 12. It is driven by a bevel pinion 50 and a mating bevel gear 52. Pinion 50 is keyed to a drive shaft 53 which is journaled on antifriction bearings 54 and 55 in the bed 10 of the machine. The gear 52 is secured to the underside of the table 11 by screws 56.

For supporting the weight of the table and further taking the axial thrust of the cut, there is provided between the bevel gear 52 and the central bearings 18 and 25, and as close as practical to the gear 52, an axial thrust bearing denoted as a whole at 60. The upper race 61 of this bearing is a ring which is secured by a clamping ring 62 and screws 63 to the underface of the table 11. The lower race of this bearing 60 is a ring 64 which is held in proper radial position concentric of the post 12 and in registry with ring 61, by a ring 65 which is secured to the bed 10 of the machine by screws 66. The rollers 67 of the bearing 60 are mounted in a conventional cage 68.

With the construction described, there is no preloading of the central bearings 18 and 25 against the outer bearing 60. Hence, there is no tendency for preload on the bearing 60 to cause any heating up of the table. Moreover, should the table distort for any reason, there is no additional load placed upon the axial thrust bearings 67, for the sleeve 15, which supports the bearings 18 and 25, is free to float and will adjust itself automatically to the proper operating position, in effect compensating for the bow. The table will run free under normal operation conditions. The invention, therefore, provides a smooth running, antifriction mounting for the table, which will operate freely at all times, and which will insure the accuracy desired in turning, facing, or boring of the work.

While antifriction thrust bearings are preferred, the bearing 60 might be replaced by a plain bearing. Such a bearing can be made of "Formica" or of any other suitable material. Where such replacement is made, either a single plain bearing may be used, or two plain bearings disposed, respectively, at different distances from the center of rotation of the table. The two plain bearings may be in the form of concentric rings spaced from one another and disposed between the central table bearing and the periphery of the table. The floating central antifriction bearing will prevent overloading the plain thrust bearing or bearings, and will adjust itself automatically to the proper operating position, in effect compensating for any bow that might be produced by the table heating up due to friction in the plain bearings or due to hot chips falling on it from the work, etc.

While the invention has been described, therefore, in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claim.

Having thus described my invention, what I claim is:

In a machine tool, a bed, a post disposed centrally of said bed, a rotary work table mounted on said bed and having a central bore to receive said post, means for rotating said table, a sleeve slidably mounted on said post, a pair of oppositely disposed conical anti-friction bearings disposed between said table and said sleeve for centering said table on said bed, each of said bearings comprising an inner race, an outer race, and a plurality of conical rollers disposed between said races, said sleeve being formed with a radially outwardly projecting flange and said table having a radially inwardly projecting rib in its bore, the inner races of the two bearings being mounted on said sleeve with one or them seated at one end against said flange, means adjustable on said sleeve and engaging the distal end of the other inner race to preload said bearings, the outer races of the two bearings being seated against opposite faces of said rib, an outer bearing disposed radially outwardly of said bearings between said table and said bed for further taking the axial thrust of said table as the table rotates on said bed during operation of the machine tool, said sleeve being free to move upwardly axially on said post as the table rotates on said bed when the machine tool is in operation, to avoid placing additional load on the outer bearing in event of distortion of said table, and a flange on said post for limiting the upward movement of said sleeve.

References Cited in the file of this patent
UNITED STATES PATENTS

| | | |
|---|---|---|
| 434,475 | Simonds | Aug. 19, 1890 |
| 1,687,806 | Strong | Oct. 16, 1928 |
| 2,422,095 | Haller | June 10, 1947 |
| 2,615,288 | Klay et al. | Oct. 28, 1952 |